United States Patent
Ujiie et al.

(10) Patent No.: US 6,738,060 B2
(45) Date of Patent: May 18, 2004

(54) 3-DIMENSIONAL ANALYSIS MODEL FORMING METHOD AND APPARATUS, 3-DIMENSIONAL ANALYSIS MODEL FORMING PROGRAM, AND ITS RECORDING MEDIUM

(75) Inventors: Kazuyuki Ujiie, Kawasaki (JP); Akira Ueda, Kawasaki (JP); Yuichi Arita, Kawasaki (JP); Koichi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 274 days.

(21) Appl. No.: 09/892,853

(22) Filed: Jun. 28, 2001

(65) Prior Publication Data

US 2002/0130861 A1 Sep. 19, 2002

(30) Foreign Application Priority Data

Mar. 16, 2001 (JP) ........................................ 2001-076212

(51) Int. Cl.[7] .............................................. G06T 17/00
(52) U.S. Cl. ........................ 345/420; 345/964; 700/98; 700/182
(58) Field of Search ................................. 345/419, 420, 345/964; 700/98, 182; 716/11, 17

(56) References Cited

U.S. PATENT DOCUMENTS 5,502,648 A * 3/1996 Kaplan ..................... 716/17

FOREIGN PATENT DOCUMENTS

JP   9-237285   9/1997

* cited by examiner

Primary Examiner—Mark Zimmerman
Assistant Examiner—Lance W. Sealey
(74) Attorney, Agent, or Firm—Staas & Halsey LLP

(57) ABSTRACT

According to a 3-dimensional analysis model forming method, a 3-dimensional detailed model constructed by a plurality of parts is inputted, the 3-dimensional detailed model is simplified into a shape suitable for layout, and it is converted into a first approximate model (3-dimensional patch approximate model). Further, the first approximate model is converted into a second approximate model (approximate model for analysis) simplified into a shape suitable for analysis by an analysis program and inputted into the analysis program.

12 Claims, 11 Drawing Sheets

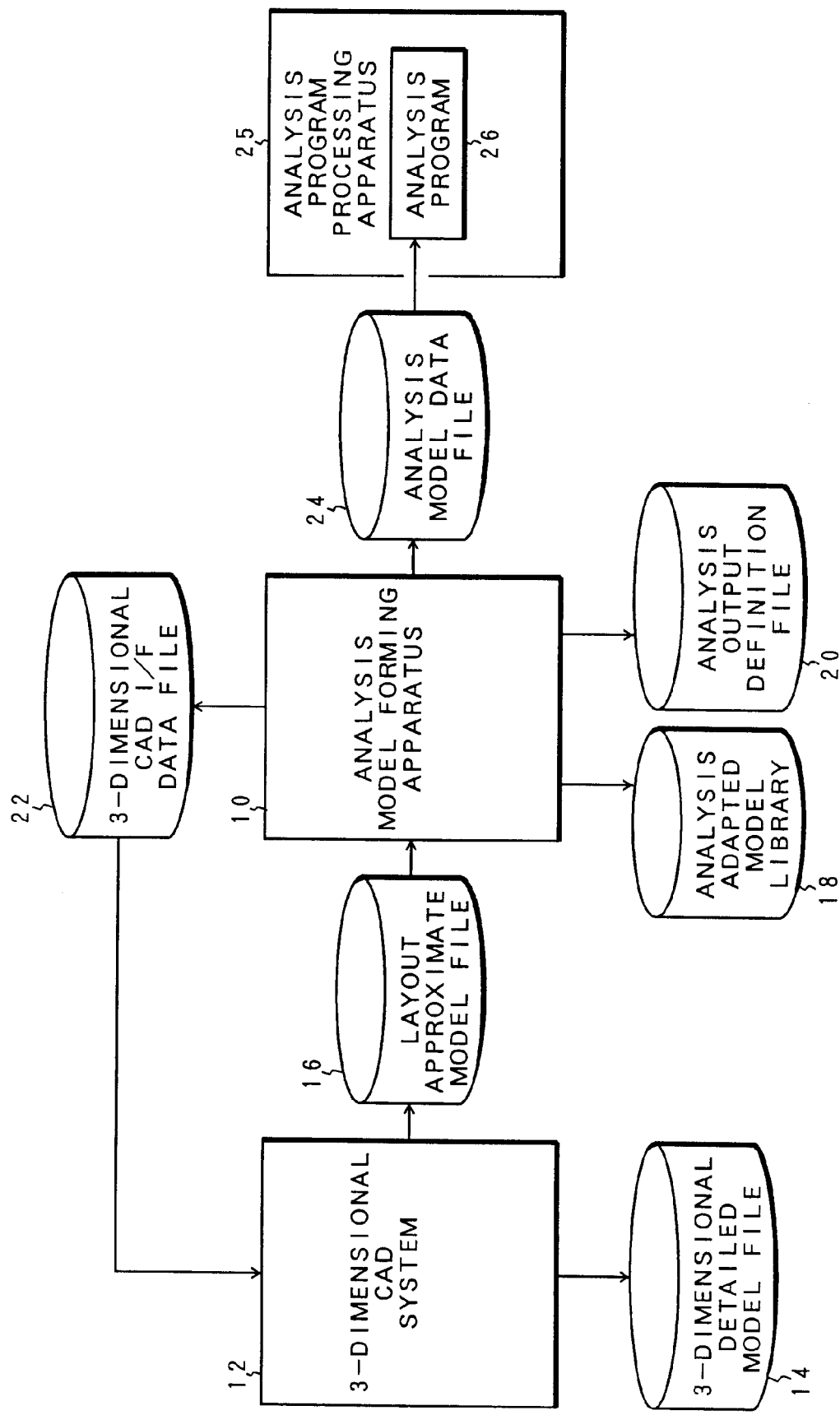

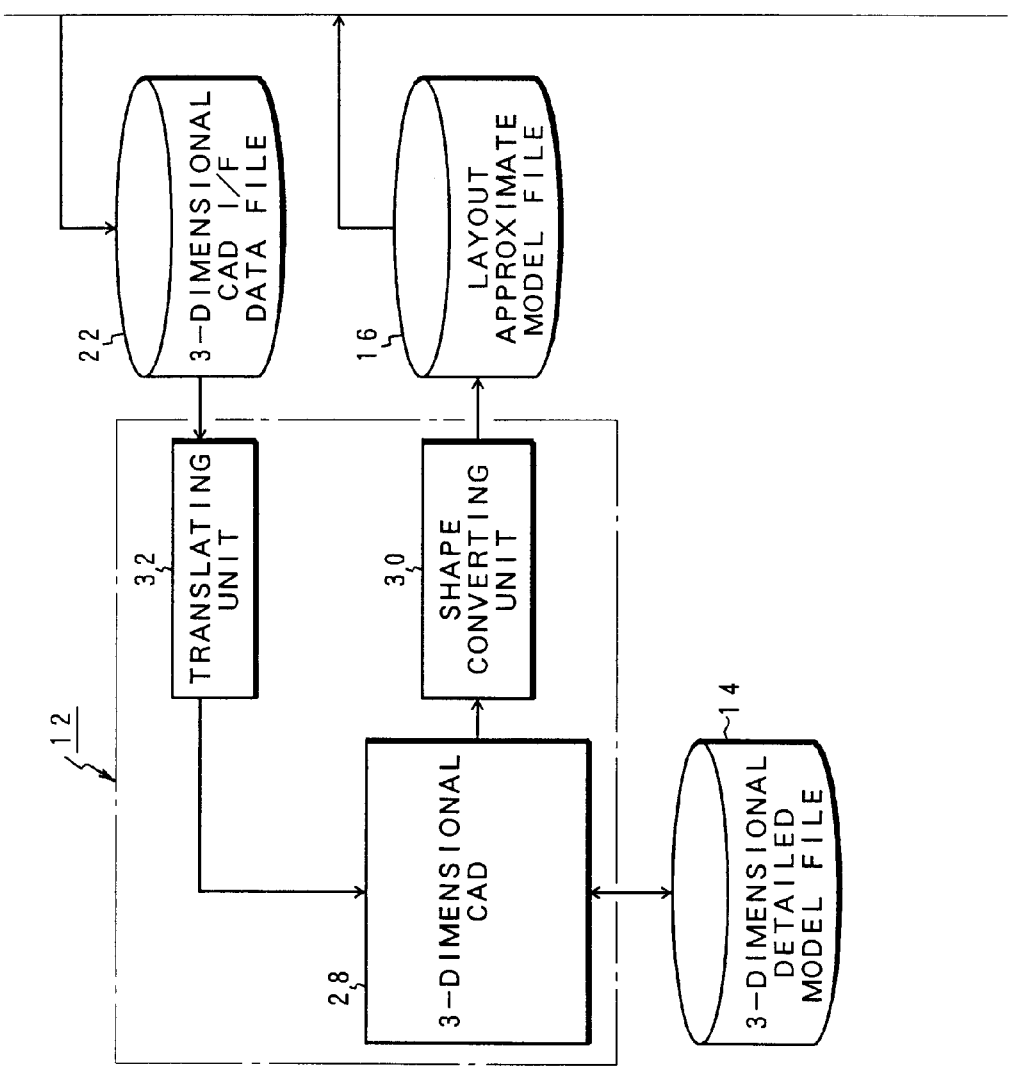

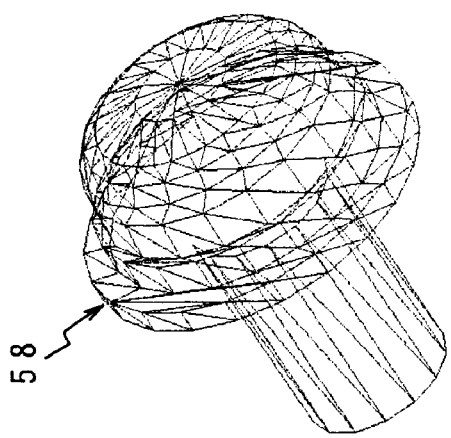
F I G. 3C
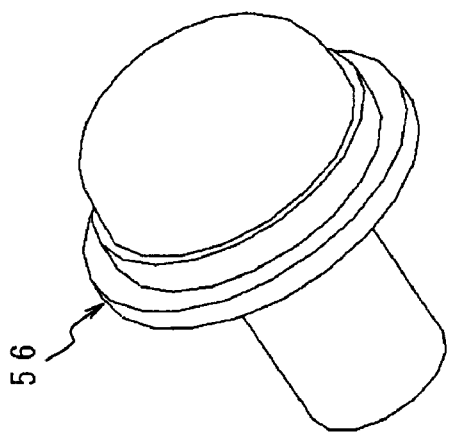
F I G. 3B
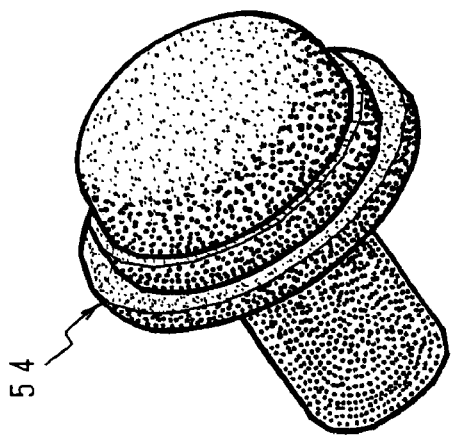
F I G. 3A

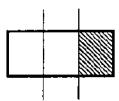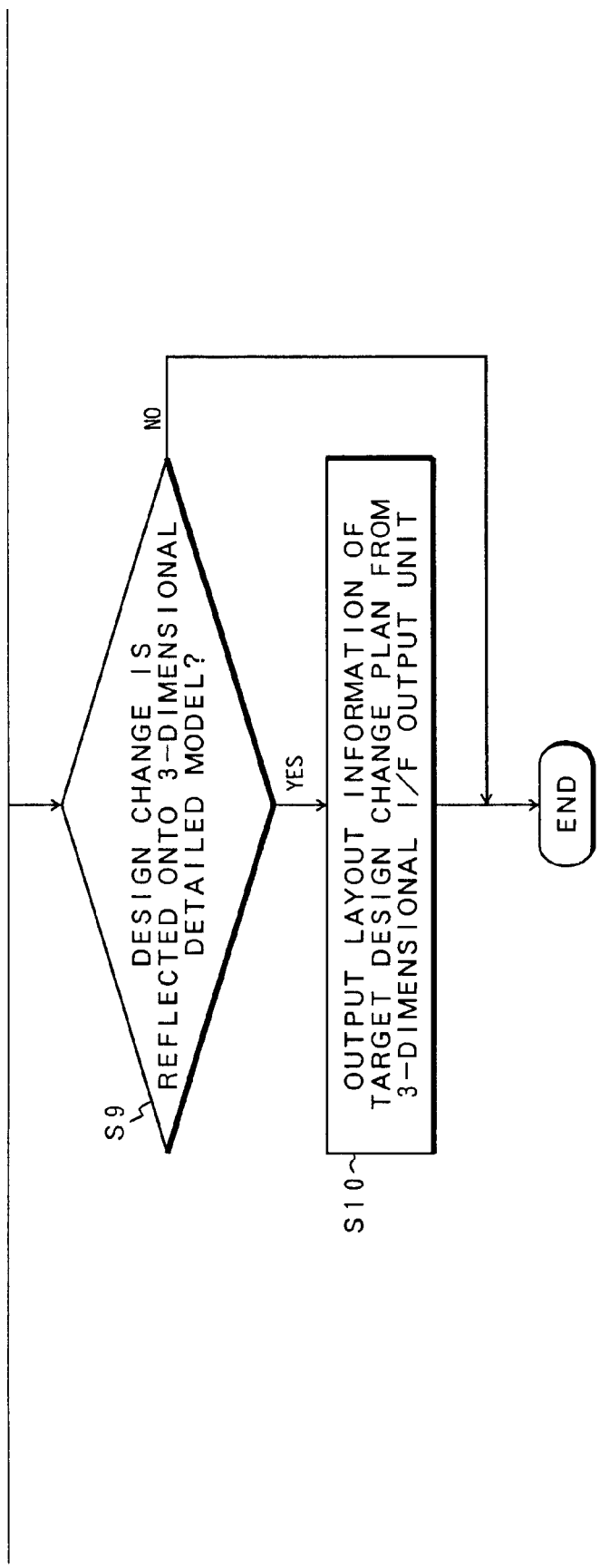
FIG. 6C

3-DIMENSIONAL ANALYSIS MODEL FORMING METHOD AND APPARATUS, 3-DIMENSIONAL ANALYSIS MODEL FORMING PROGRAM, AND ITS RECORDING MEDIUM

BACKGROUND OF THE INVENTION

1. Field of the Invention

The invention relates to 3-dimensional analysis model forming method and apparatus and a 3-dimensional analysis model forming program for forming a 3-dimensional analysis model by simplifying a shape of a 3-dimensional detailed model, and to a recording medium for storing such a program. More particularly, the invention relates to 3-dimensional analysis model forming method and apparatus and a 3-dimensional analysis model forming program for automatically forming a design substitute idea by a layout change with regard to a 3-dimensional detailed model and automatically performing shape approximation suitable for various analyzing processes, and to a recording medium for storing such a program.

2. Description of the Related Arts

Hitherto, development and design of equipment and apparatuses have been made by using a 3-dimensional CAD system and, in the product development, the designer has to achieve issues of realization of high performance, miniaturization, reduction of a weight, reduction of costs, diversification of use environments, consideration for an earth environment, and the like in a short period. Therefore, in the product development using the 3-dimensional CAD system, with respect to a designed 3-dimensional detailed model, a necessary analysis is made by using various analysis programs such as thermal fluid, electromagnetic analysis, and the like, verification is made, an arrangement change (space planning) for arranging parts of a product into optimum positions on the basis of an analysis result is repeated, and an optimum design idea is determined and reflected to the 3-dimensional detailed model.

However, in the use of the various analysis programs which take up an important part in the development and design of the product using the 3-dimensional CAD system, the number of steps of forming data of an analysis model serving as an input is very large. Although some of methods of forming the analysis model have an effect of reduction of the number of forming steps owing to the spread of the 3-dimensional CAD system, a sufficiently efficient method is not established yet in terms of the following points. First, in the case where a 3-dimensional detailed model obtained by converting a detailed shape of a product into a 3-dimensional shape by the 3-dimensional CAD system is formed, if it is intended to input the 3-dimensional detailed model as it is into the analysis program, the number of analysis meshes by a polygon constructing an external shape of the model is very large, so that this method cannot be used practically. To form a model shape which can be used in the analysis program from the beginning, since it is necessary to manually approximate an original product model shape, a large number of steps are still necessary. Further, if it is necessary to evaluate a design substitute idea which is different from an original design idea and accompanied with, for example, a change in parts layout, hitherto, it has been necessary to return to the 3-dimensional CAD system and change the design. However, since response performance of the 3-dimensional CAD system deteriorates with an increase in design scale, a larger number of steps are necessary during the operation time of the CAD system.

SUMMARY OF THE INVENTION

According to the invention, there are provided 3-dimensional analysis model forming method and apparatus and a 3-dimensional analysis model forming program for forming an approximate model suitable for a design change such as a parts layout change or the like and an approximate model suitable for an analysis by automatically simplifying an original 3-dimensional detailed model, and a recording medium for storing such a program is also provided.

According to the invention, there is provided a 3-dimensional analysis program forming method comprising the steps of: inputting a 3-dimensional detailed model of a product constructed by a plurality of parts from, for example, a 3-dimensional CAD system;

converting a shape of the 3-dimensional detailed model into a simplified first approximate model suitable for layout; and further, converting the first approximate model into a second approximate model simplified into a shape suitable for analysis by the analysis program.

As a second approximate model, the first approximate model is converted into an approximate shape obtained by combining a plurality of boundary boxes corresponding to portions and parts constructing the first approximate model. The boundary box is a rectangular parallelepiped expressing a boundary region of the portion of the first approximate model. The second approximate model converted from the first approximate model is registered into a library without being corrected or registered therein after it is corrected. As a second approximate model, the first approximate model is replaced with the second approximate model registered in the library. At a point when an optimum design idea of the first approximate model is determined in accordance with an analysis result of the second approximate model, layout information of the decided first approximate model is extracted and reflected to the original 3-dimensional detailed model. According to the invention as mentioned above, by executing the simplification of two stages such that after the original 3-dimensional detailed model formed by using the 3-dimensional CAD system or the like is simplified to the first approximate model suitable for layout, it is simplified to the second approximate model suitable for analysis, the simplification at each stage can be efficiently performed at a high speed, so that a speed of formation of the second approximate model for analysis can be also raised as a whole. The design change such as a layout change or the like for the analysis result of the second approximate model can be made at a level of the first approximate model. Since the simplification of the second approximate model from the design changed first approximate model can be performed at a high speed, the design change until it reaches the optimum design idea and its analyzing operation can be efficiently repeated at a high speed.

According to the invention, there is provided a 3-dimensional analysis model forming apparatus comprising: an input unit (3-dimensional CAD) which inputs a 3-dimensional detailed model constructed by a plurality of parts; a first converting unit (shape converting unit) which simplifies the 3-dimensional detailed model into a shape suitable for layout and converts into a first approximate model; and a second converting unit (box converting unit) which further simplifies the first approximate model into a shape suitable for analysis and converts it into a second approximate model. The details of the 3-dimensional analysis model forming apparatus are fundamentally the same as those of the 3-dimensional analysis model forming method.

According to the invention, there is provided a 3-dimensional analysis model forming program for allowing a computer to execute the steps of: inputting a 3-dimensional detailed model constructed by a plurality of parts; simplifying a shape of the 3-dimensional detailed model and converting it into a first approximate model suitable for layout; and further simplifying the first approximate model into a shape suitable for analysis and converting it into a second approximate model. The details of the 3-dimensional analysis model forming program are fundamentally the same as those of the 3-dimensional analysis model forming method.

According to the invention, there is provided a computer-readable recording medium which stores a 3-dimensional analysis model forming program, wherein this program allows a computer to execute the steps of: inputting a 3-dimensional detailed model constructed by a plurality of parts; simplifying a shape of the 3-dimensional detailed model and converting it into a first approximate model suitable for layout; and further simplifying the first approximate model into a shape suitable for analysis and converting it into a second approximate model. The details of the recording medium which stores the 3-dimensional analysis model forming program are fundamentally the same as those of the 3-dimensional analysis model forming method.

The above and other objects, features, and advantages of the present invention will become more apparent from the following detailed description with reference to the drawings.

BRIEF DESCRIPTION OF THE DRAWINGS

FIG. 1 is an explanatory diagram of a system construction of the invention;

FIGS. 2A and 2B are block diagrams of a functional construction of the invention;

FIGS. 3A to 3C are explanatory diagrams of a 3-dimensional detailed model, a first approximate model, and a second approximate model in the invention;

FIGS. 6A to 6C are flowcharts for a 3-dimensional analysis model forming process according to the invention;

DETAILED DESCRIPTION OF THE PREFERRED EMBODIMENT

Figure 2B:
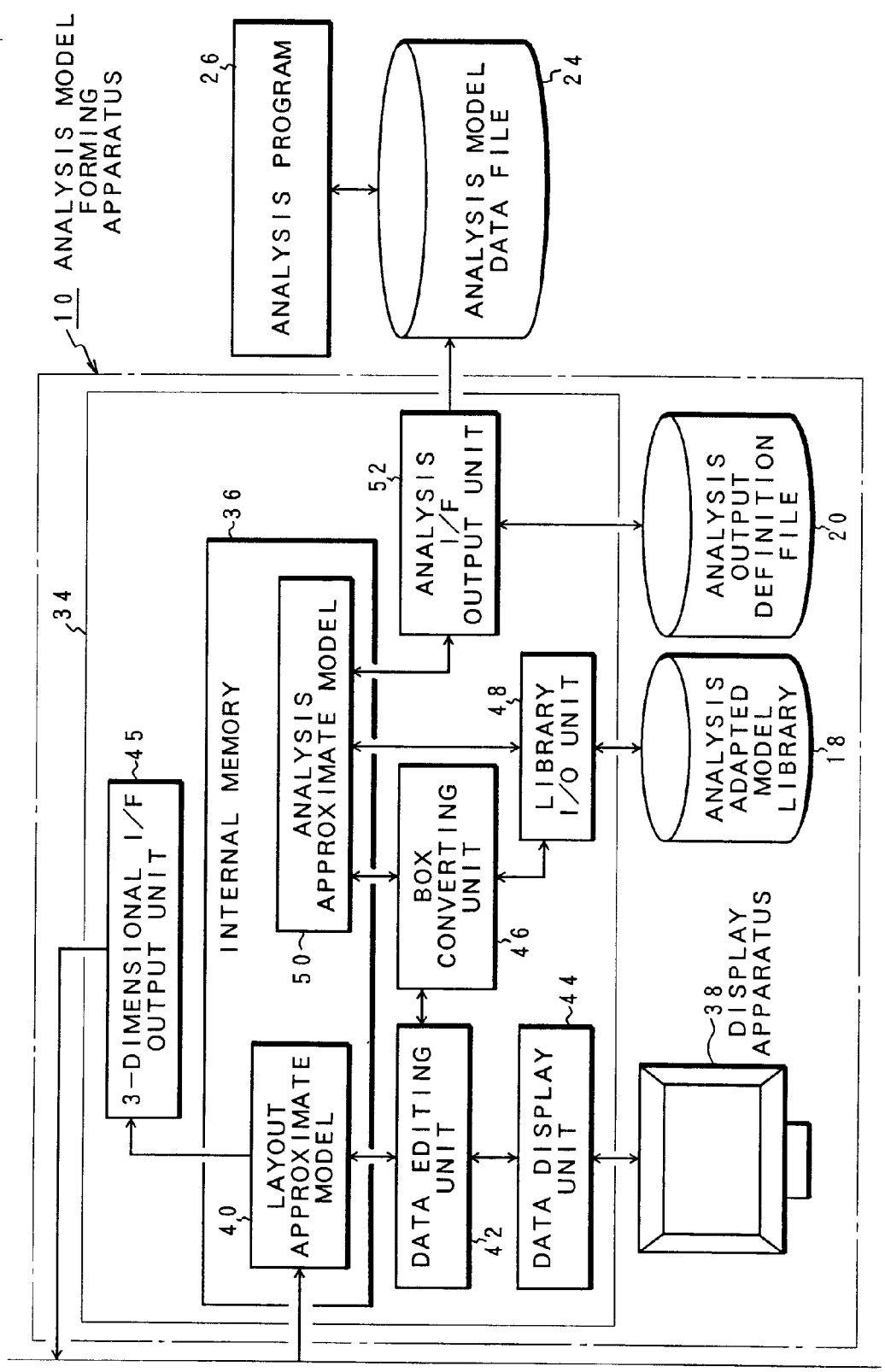

FIG. 1 is an explanatory diagram of a construction of a system to which a 3-dimensional analysis model forming method according to the invention is applied. In the 3-dimensional analysis model forming system, a 3-dimensional CAD system 12 is arranged at the front stage of an analysis model forming apparatus 10, and an analysis program processing apparatus 25 having an analysis program 26 is arranged at the post stage of the apparatus 10. A 3-dimensional detailed model file 14 is provided for the 3-dimensional CAD system 12. An approximate model file 16 for layout is provided between the 3-dimensional CAD system 12 and analysis model forming apparatus 10. An approximate model for layout (first approximate model) obtained by simplifying a 3-dimensional detailed model file formed on the 3-dimensional CAD system 12 side into a shape model whose layout is possible is stored in the layout approximate model file 16. An analysis adapted model library 18, an analysis output definition file 20, and a 3-dimensional CAD interface data file 22 are provided for the analysis model forming apparatus 10. The analysis model forming apparatus 10 reads out the approximate model for layout from the layout approximate model file 16 and executes a layout change and the like of parts units constructing the model as necessary. After that, the apparatus 10 converts the layout approximate model into an approximate model for analysis (second approximate model) obtained by simplifying it into a shape suitable for processes of the analysis program 26 and converts the analysis approximate model into a data format of a specific analysis program stored in the analysis output definition file 20. The obtained analysis model data is stored into an analysis model data file 24. The analysis program processing apparatus 25 extracts the analysis model to be analyzed from the analysis model data file 24, inputs it into the analysis program 26, and executes necessary analyses such as thermal fluid analysis, electromagnetic analysis, resin fluidity analysis, and the like. An analysis result by the analysis program 26 is displayed to the designer. The designer sees the analysis result, makes a layout change or the like again by the analysis model forming apparatus 10, simplifies the layout approximate model as a design change idea obtained after completion of the layout change into the analysis approximate model, and repeats the processes by the analysis program 26, thereby deciding an approximate model for layout as a final optimum design idea. With respect to the layout approximate model for layout of the optimum design idea determined as mentioned above, its layout information is stored into the 3-dimensional CAD interface data file 22 and reflected to the 3-dimensional CAD system 12. The design change of the 3-dimensional detailed model is made.

FIGS. 2A and 2B are block diagrams of functions and constructions of each system and apparatus in the construction of the system to which the 3-dimensional analysis model forming method of FIG. 1 is applied. A 3-dimensional CAD 28 functioning as a main engine, a shape converting unit 30, and a translating unit 32 are provided for the 3-dimensional CAD system 12. The 3-dimensional CAD 28 supports the product developing operation which is executed by the designer, and a 3-dimensional detailed model of the formed product has been stored in the 3-dimensional detailed model file 14. At the time of the analysis model forming process of the invention, the 3-dimensional CAD 28 functioning as an input unit reads out the 3-dimensional detailed model of the target product from the 3-dimensional detailed model file 14. In the shape converting unit 30 which functions as a first converting unit, the 3-dimensional detailed model is converted into the layout approximate model (first approximate model) suitable for the formation of the design change idea by the layout change of the parts constructing the product, that is, by the space planning and stored into the layout approximate model file 16. Specific examples of the conversion from the 3-dimensional detailed model into the layout approximate model by the shape converting unit 30 are, for example, as shown in FIGS. 3A to 3C.

FIG. 3A shows an example of a 3-dimensional detailed model 54 formed by the 3-dimensional CAD system 12. This model is constructed as a model having detailed graphics obtained by performing processes of a color, a texture, and the like to the surface of a 3-dimensional shape of the product. FIG. 3B is an explanatory diagram of an approximate model 56 for layout simplified into a shape suitable for layout by the shape converting unit 30 in FIG. 2. The layout approximate model 56 is simplified as a shape model obtained by extracting an outline of the original 3-dimensional detailed model 54. The layout approximate model (first approximate model) is usually called a 3-dimensional patch approximate model or a digital mockup.

Referring again to FIGS. 2A and 2B, the analysis model forming apparatus 10 has a computer apparatus 34 and functions shown by blocks are realized by the execution of the analysis model forming program of the invention by a CPU. As functions of the computer apparatus 34, a data editing unit 42, a data display unit 44, a box converting unit 46, a library input/output unit 48, an analysis I/F output unit 52, and further, a 3-dimensional I/F output unit 45 are provided. A layout approximate model 40 inputted from the layout approximate model file 16 in order to form the analysis model and an analysis approximate model 50 simplified into a shape suitable for the analysis program 26 have been developed in an internal memory 36 of the computer apparatus 34. The data editing unit 42 changes an internal layout of the model on the basis of the instructing operation of the designer with respect to the layout approximate model 40 which was inputted and developed into the internal memory 36, thereby forming a design change idea. With respect to the design change of the layout approximate model 40 by the data editing unit 42, the layout approximate model 40 is displayed on a display apparatus 38 through the data display unit 44 and a necessary layout change can be made.

Figure 4C:
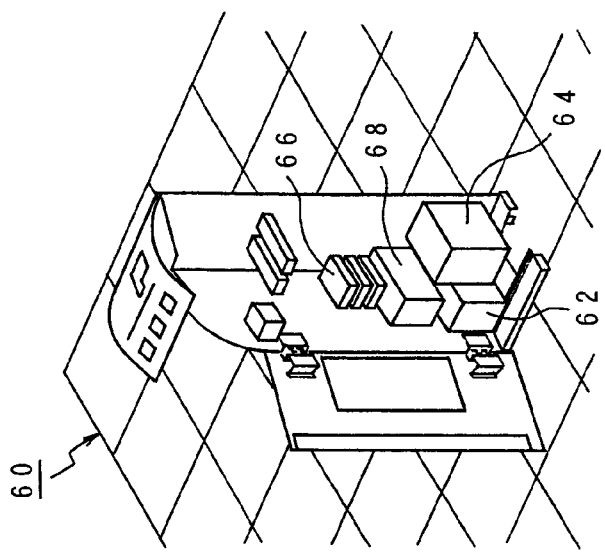
FIGS. 4A to 4C are explanatory diagrams of a layout change in the invention.
Figure 4B:
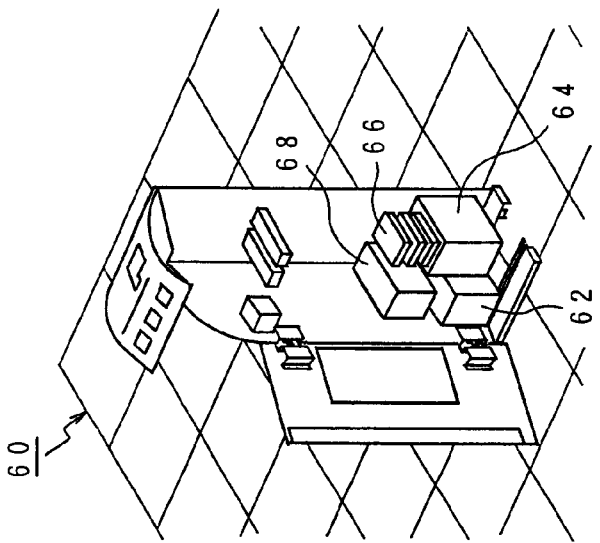
Figure 4A:
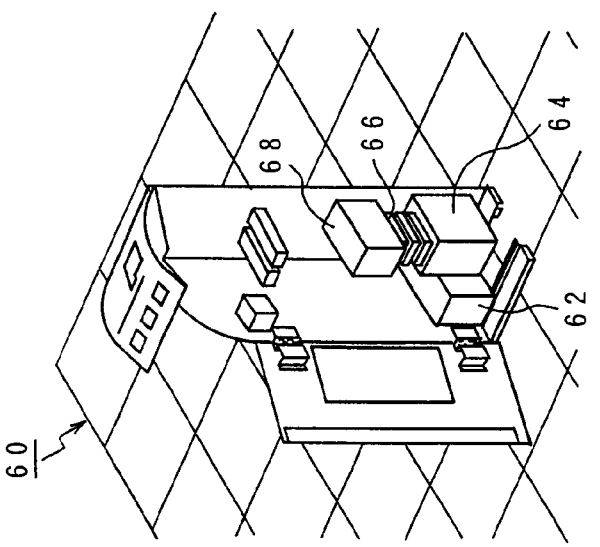

FIGS. 4A to 4C show specific examples of the changing operation of the layout approximate model using the data editing unit 42. FIG. 4A shows a layout approximate model 60 which was inputted first. The layout approximate model 60 relates to an example of an assembly unit of a certain product and parts units 62, 64, 66, and 68 are arranged therein. In such an original layout, for example, as shown in FIG. 4B, a design change such as to move the parts unit 68 to a position over the parts unit 62 is made. Further, according to another design change idea of FIG. 4C, a layout change such as to move the parts unit 66 to a position on the moved parts unit 68 is made. According to such formation of the design change idea by the change of the internal layout in the analysis model forming apparatus 10, as compared with the layout change using the detailed shape model on the 3-dimensional CAD system 12 side, since the layout approximate model in the shape simplified by the shape converting unit 30 is processed as a target, a data amount of the model itself is remarkably reduced. The layout change of the parts units as shown in FIGS. 4A to 4C can be made at a high speed.

In the case where the analysis by the analysis program 26 is made with respect to the layout approximate model 40 in the internal memory 36 which is obtained after the design change is finished in the data editing unit 42, what is called a box conversion for simplifying the model into the shape suitable for the analysis program 26 is executed by the box converting unit 46 which functions as a second converting unit by using the boundary box which has previously been stored in the analysis adapted model library 18. The boundary box relates to a method whereby a boundary region is expressed by a rectangular parallelepiped among methods of expressing the boundary region for the shapes of parts and portions of a 3-dimensional shape model. Fundamentally, with respect to the layout approximate model 40 in the internal memory 36 as a target, the box converting unit 46 approximates the boundary region by a combination of boundary boxes of various sizes as a plurality of rectangular parallelepipeds, thereby automatically forming an approximate model for analysis in a lump. Besides the automatic formation of the analysis approximate model by the combination of the boundary boxes, the box converting unit 46 can also execute a box converting process for selecting and combining boundary boxes corresponding to boundary shapes such as parts units or the like of the layout approximate model 40 from a plurality of kinds of boundary boxes which have previously been stored in the analysis adapted model library 18. That is, since the boundary boxes corresponding to the parts constructing the layout approximate model have been prepared in the analysis adapted model library, the box converting process for replacing each parts unit of the 3-dimensional approximate model for layout by using the boundary boxes as parts registered in the library is executed. Further, the designer can also select and convert the boundary boxes which are used for conversion on the display apparatus 38. As mentioned above, the approximate model for analysis (second approximate model) suitable for the analysis program 26 constructed by the combination of the boundary boxes corresponding to the parts of the product is formed from the layout approximate model 40 by the box converting unit 46 and developed as an analysis approximate model 50 into the internal memory 36. The analysis I/F output unit 52 reads out the analysis approximate model 50 formed in the internal memory 36, converts its data format into a data format of the analysis program 26 as an analysis target stored in the analysis output definition file 20, and outputs it to the analysis model data file 24. As data formats defined in the analysis output definition file 20, for example, there are data formats such as thermal fluid analysis program, electromagnetic analysis program, resin fluidity analysis program, and the like.

Figure 5:
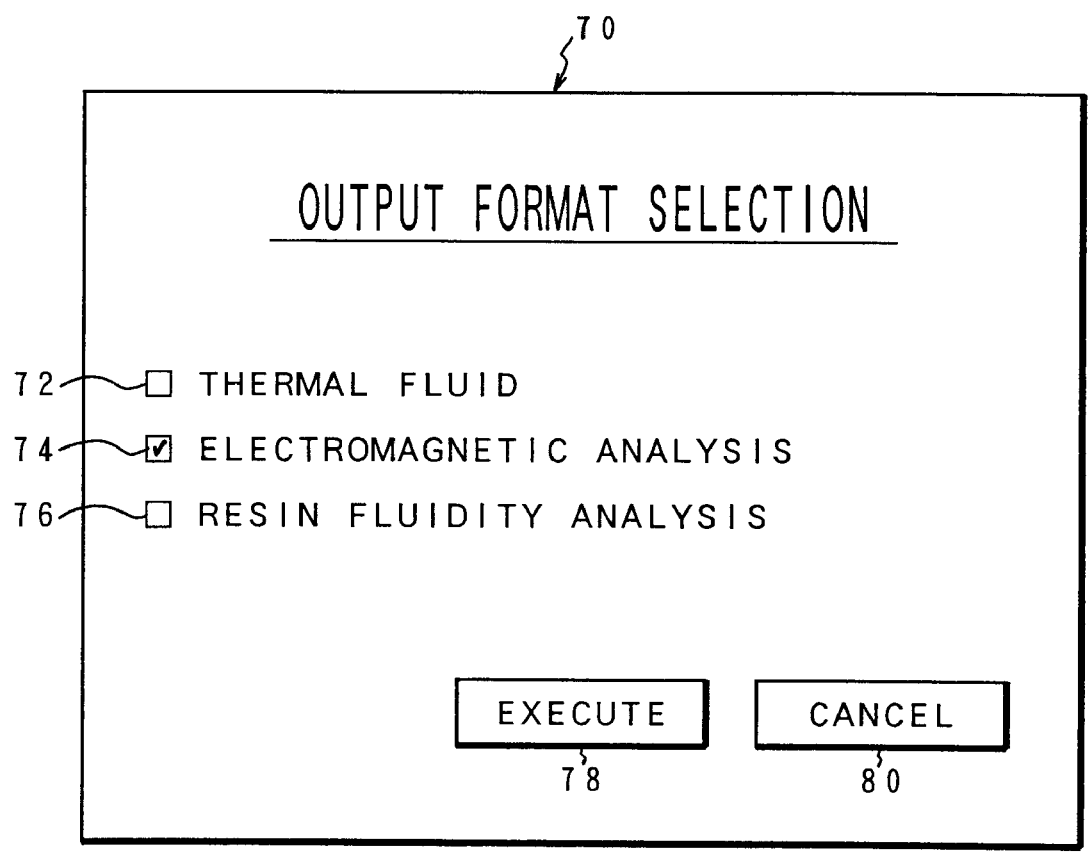
FIG. 5 is an explanatory diagram of an analysis menu picture plane for inputting and analyzing a 3-dimensional analysis model formed in the invention.

FIG. 5 shows an example of an analysis processing menu picture plane 70 which is used by the analysis program processing apparatus 25 in FIG. 1. On the analysis processing menu picture plane 70, as output formats of the analysis result for the analysis model data, three formats of a thermal fluid analysis of a check box 72, an electromagnetic analysis of a check box 74, a resin fluidity analysis of a check box 76 can be selected. For example, by selecting the check box 74 of the electromagnetic analysis and pressing an Execute key 78, the electromagnetic analysis by the analysis program 26 is made and an analysis result can be displayed on the display apparatus 38.

The analysis program 26 of the analysis program processing apparatus 25 reads out the analysis model data as a target from the analysis model data file 24, analyzes it, and displays an analysis result to the designer by using, for example, the display apparatus 38 of the analysis model forming apparatus 10. The designer sees the analysis result by the analysis program 26 and makes a change or the like of an internal layout for changing a layout of the parts units such that an inconvenience due to the analysis result is eliminated with respect to the corresponding layout approximate model 40, thereby forming a new design change idea. With respect to the new design change idea formed from the analysis result as mentioned above, similarly, the analysis approximate model 50 simplified into the shape as a combination of the boundary boxes obtained by the box converting unit 46 is formed, a data format is converted into the data format of the analysis output definition file 20 by the analysis I/F output unit 52, after that, it is inputted to the analysis program 26 through the analysis model data file 24, and the new design change idea is analyzed. With respect to the layout approximate model 40 as an optimum design idea determined from the analysis result by the analysis model forming apparatus 10, an identification name and position information of each parts unit (corresponding to the boundary box) constructing the layout approximate model 40 are extracted by the 3-dimensional I/F output unit 45 and outputted to the 3-dimensional CAD interface data file 22. The 3-dimensional CAD system 12 has the translating unit 32 which is realized by the execution of a translating program, and can reflect the determined design change idea to the 3-dimensional detailed model by using the identification names and position information of the parts unit of the layout approximate model 40 stored in the 3-dimensional CAD interface data file 22.

Figure 6A:
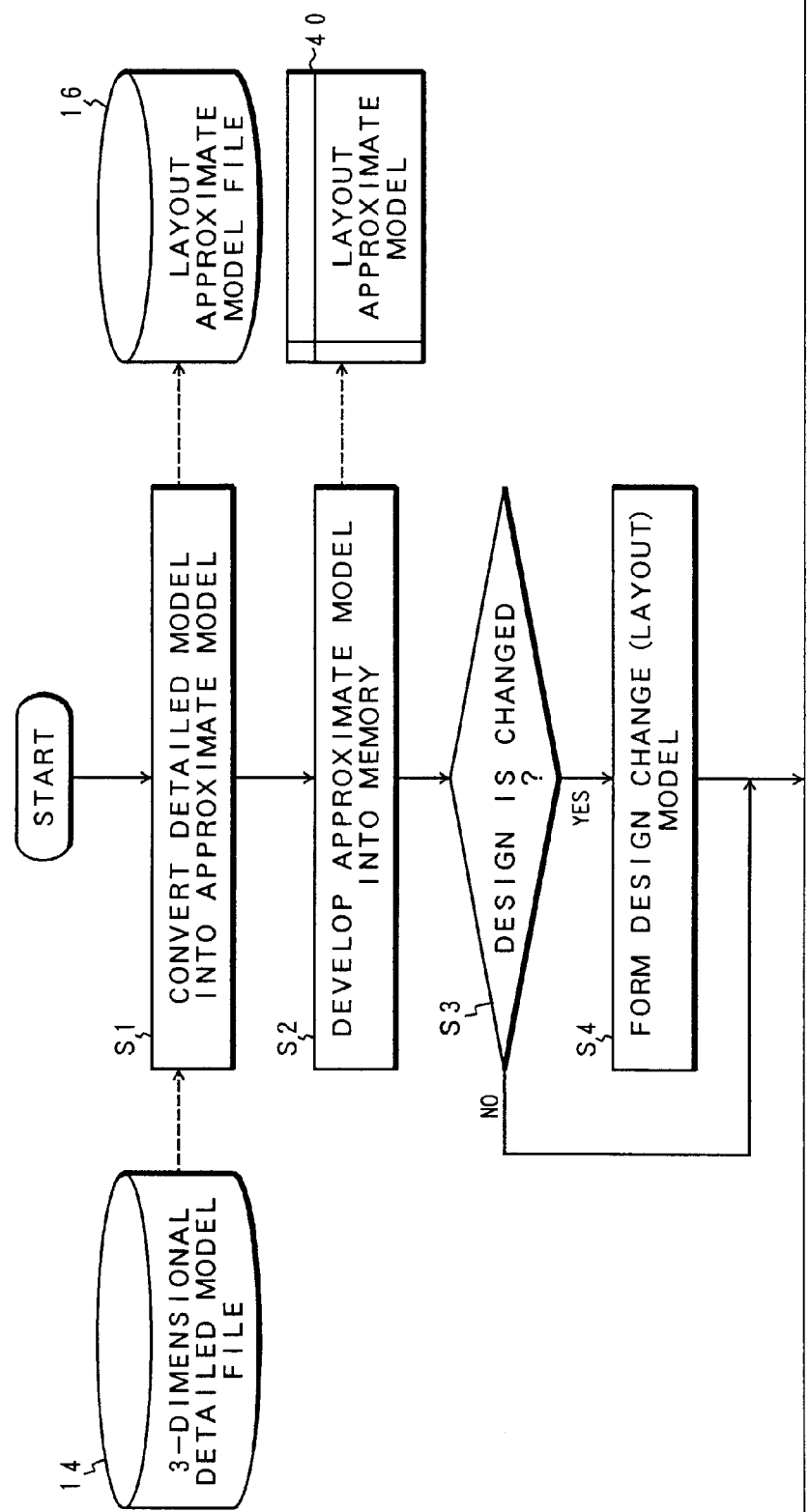
Figure 6B:
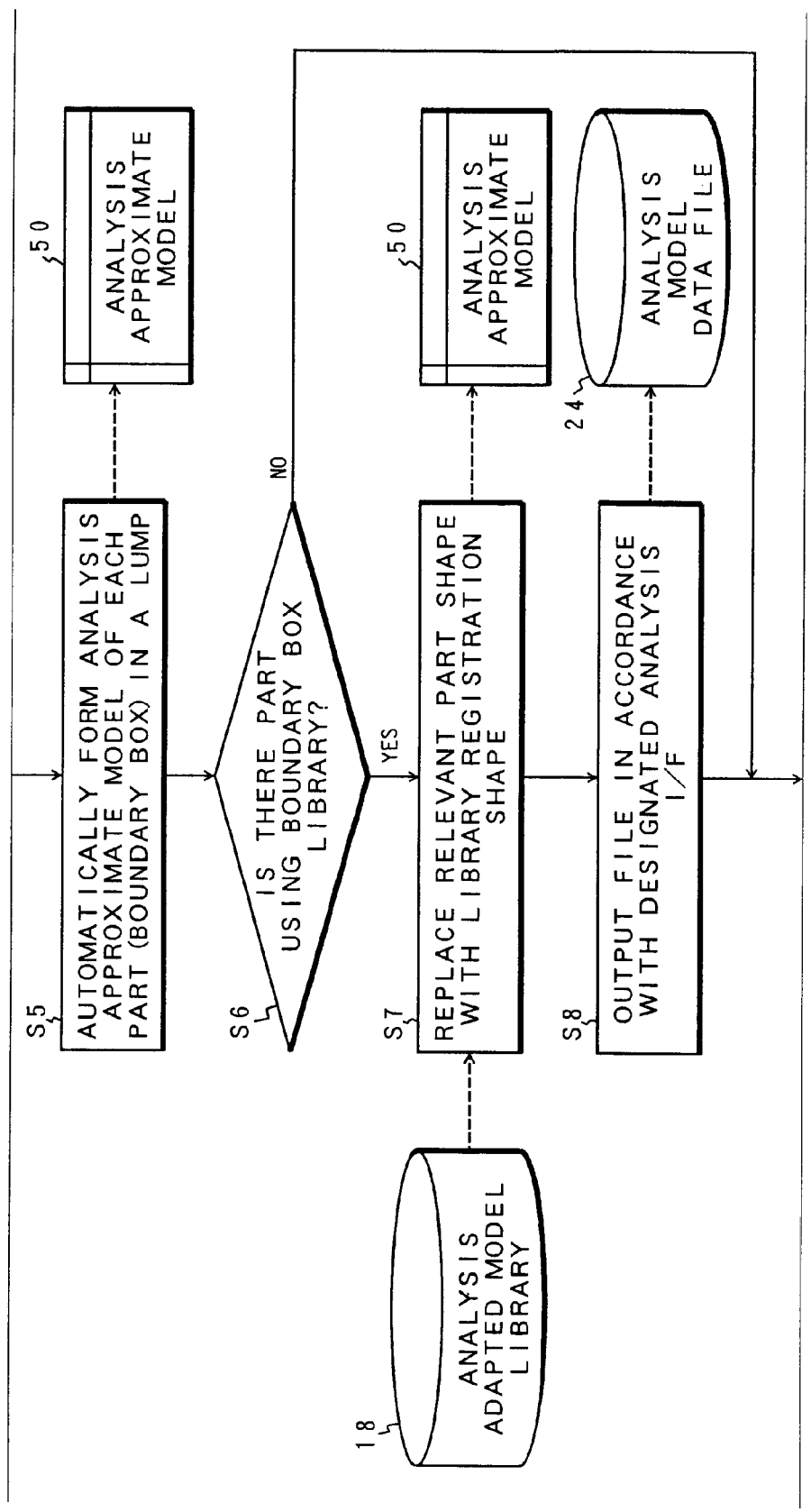

FIGS. 6A to 6C are flowcharts showing a processing procedure for the 3-dimensional analysis model forming process according to the invention with respect to the system construction of FIGS. 2A and 2B as a target. First, in step S1, the 3-dimensional detailed model as an analysis target is read out from the 3-dimensional detailed model file 14 and converted into the layout approximate model (first approximate model) as a shape suitable for the layout change by the shape converting unit 30 of the 3-dimensional CAD system 12 and stored into the layout approximate model file 16. Subsequently, in step S2, the approximate model for layout is read out and developed as a layout approximate model 40 into the internal memory 36 of the analysis model forming apparatus 10. In step S3, the presence or absence of the design change is discriminated. If there is the design change, step S4 follows and a design change model is formed by a layout change or the like of the parts units by the data editing unit 42. Subsequently, in step S5, a batch automatic formation for simplifying each part of the model into an analysis approximate model is executed by the box converting unit 46 with respect to the layout approximate model in the internal memory 36 as a target. Specifically speaking, a batch automatic formation into boundary boxes for approximating a boundary of each part of the model by a rectangular pararrelepiped is executed. By a combination of the boundary boxes, the analysis approximate model 50 is developed into the internal memory 36. In step S6, the presence or absence of the parts which use the boundary boxes prepared in the analysis adapted model library 18 is discriminated. If there are the parts which use the boundary boxes, the corresponding parts shape is replaced with the boundary box of the shape registered in the library in step S7. A result of the replacement with the boundary box of the shape registered in the library is likewise reflected to the analysis approximate model 50 in the internal memory 36. After completion of the conversion into the analysis approximate model 50 comprising the combination of the boundary boxes as mentioned above, in step S8, the analysis model data file 24 is referred to by the analysis I/F output unit 52, the model 50 is converted into the data format designated in correspondence to the analysis program which is used for analysis and the analysis model data file 24 is allowed to output the analysis approximate model. Thus, the analysis approximate model is analyzed by the analysis program 26 and an analysis result is outputted to the designer. Subsequently, step S9 follows and whether the result of the design change by the layout approximate model 40 developed in the internal memory 36 in the analysis model forming apparatus 10 is reflected to the 3-dimensional detailed model stored on the 3-dimensional CAD system 12 side or not is discriminated. In case of reflecting the design change, in step S10, the layout information of the layout approximate model 40 as a target design change idea, specifically speaking, the identification names and position information of the parts units constructing the model are outputted to the 3-dimensional CAD system 12 side by the 3-dimensional I/F output unit 45 and reflected to the 3-dimensional detailed model. In the actual designing operation using the analysis result of the analysis program, the processes in steps S3 to S8 in FIGS. 6A to 6C are repeated while the analysis result is seen. Therefore, the layout approximate models 40 corresponding to a plurality of design ideas and the analysis approximate models 50 obtained by converting those models into the combinations of the boundary boxes exist in the internal memory 36 of the analysis model forming apparatus 10.

According to the analysis model forming program which is provided by the present invention, although the procedure according to the flowcharts of FIGS. 6A to 6C is executed by the computer, the process of the shape converting unit 30 in step S1 in the above procedure becomes a processing procedure for requesting the 3-dimensional CAD system 12 side to execute the process. In the system construction of FIG. 2, the invention is not limited to a case where the 3-dimensional CAD system 12, analysis model forming apparatus 10, and analysis program processing apparatus 25 are arranged at positions which are physically dose to each other, but the invention also incorporates a network construction such that they are arranged at remote positions, respectively, they are connected by communication lines, and necessary data is transmitted and received among them.

Figure 7:
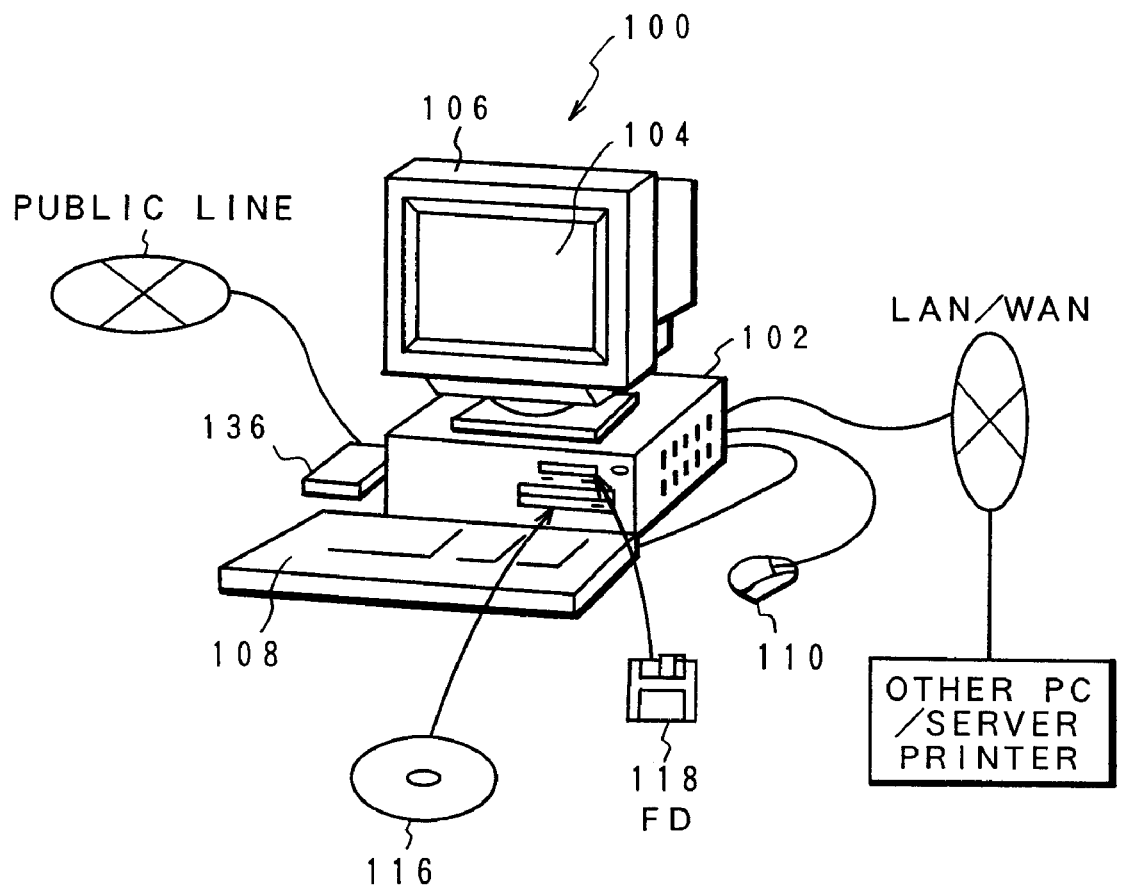
FIG. 7 is an explanatory diagram of a computer system using a recording medium which stores a 3-dimensional analysis model forming program of the invention.
Figure 8:
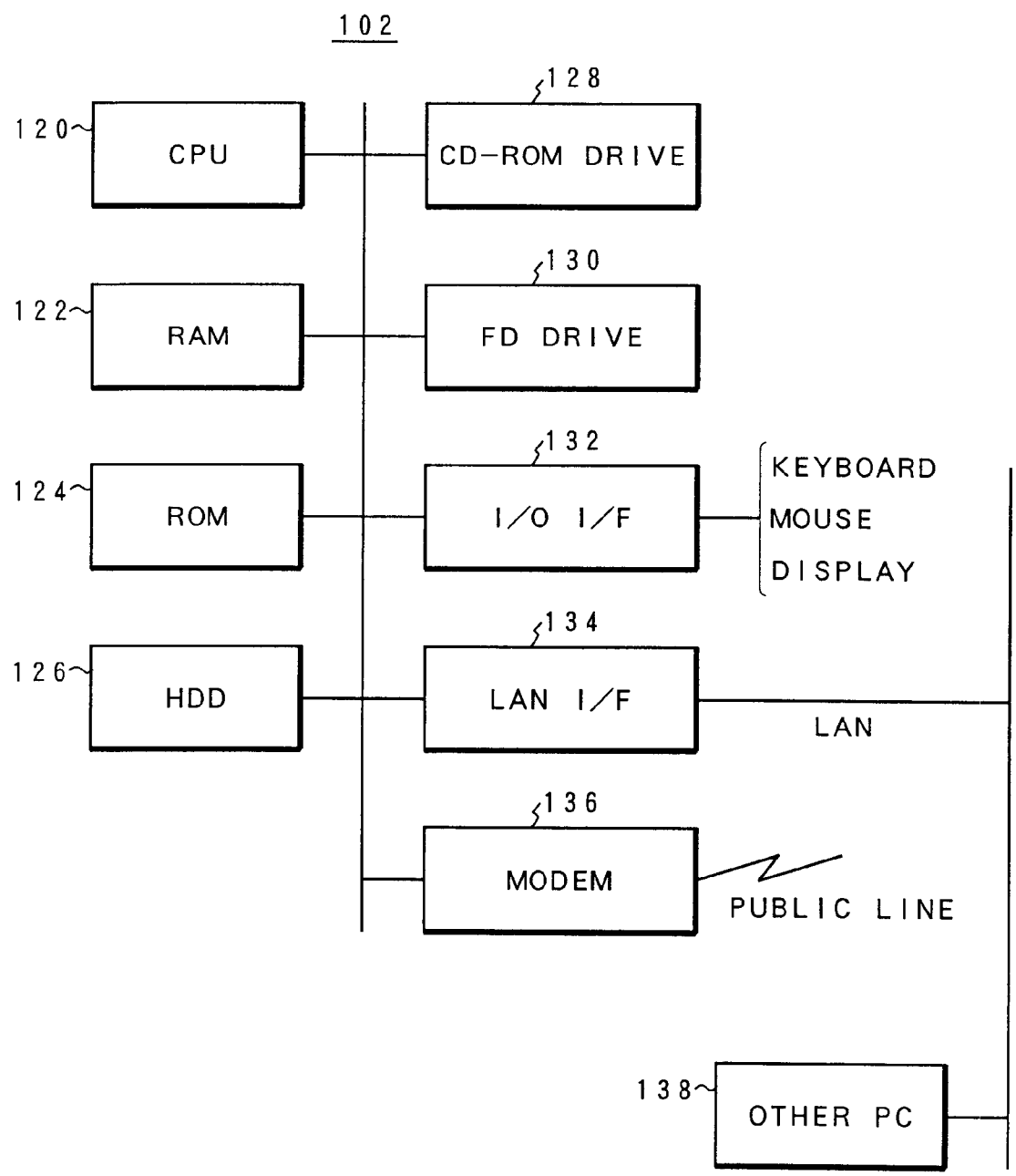
FIG. 8 is a block diagram of an internal construction of a main body portion in FIG. 7.

An embodiment of a computer-readable recording medium which stores the 3-dimensional analysis model forming program of the invention will now be described. A computer system 100 in FIG. 7 is a system for executing the 3-dimensional analysis model forming program of the invention and has a main body 102. As shown in FIG. 8, the main body 102 has therein a CPU 120, an RAM 122, an ROM 124, a disk drive apparatus HDD 126, a CD-ROM drive 128, an FD drive 130, an I/O interface 132 for connecting a keyboard, a mouse, and a display, an LAN interface 134, a modem 136, and the like. The computer system 100 further has: a display 106 for displaying information such as an image or the like onto a display screen 104 by an instruction from the main body 102; a keyboard 108 for inputting various information to the computer system 100; and a mouse 110 for designating an arbitrary position on the display screen 104 of the display 106. The 3-dimensional analysis model forming program of the invention is stored into a portable storage medium such as CD-ROM, floppy disk, DVD-ROM, magnetooptic disk IC card, or the like, a database connected through a line by using the modem 136 and LAN interface 134, or database of another computer system PC and installed into the computer system 100. Thereafter, the program is executed by the computer system 100. Besides the portable storage media such as CD-ROM 116, floppy disk FD 118, DVD-ROM, magnetooptic disk, IC card, and the like and the storing apparatuses such as a hard disk HDD and the like equipped in and out of the computer system 100, the recording media here include the database for holding the program through the line or another computer system PC and its database, and furthermore, a transmission medium on the line.

According to the invention as mentioned above, the 3-dimensional detailed model constructed by a plurality of parts is inputted, its shape is simplified into the shape suitable for layout, converted into the first approximate model, and further, the first approximate model is converted into the second approximate model simplified to the shape suitable for analysis by the analysis program and inputted to the analysis program. Therefore, by executing the simplification of two stages until it is converted into the approximate model for analysis to the original 3-dimensional detailed model, since a burden on the simplifying process at each stage is small, it can be simplified at a high speed at each stage. Thus, the conversion from the 3-dimensional detailed model as a whole into the second approximate model for analysis can be also executed at a high speed. The formation of the design change idea such as a layout change or the like for the analysis result of the second approximate model as an analysis approximate model can be made at the level of the first approximate model. The simplification from the first approximate model obtained after completion of the design change into the second approximate model can be made at a high speed. Therefore, the repetition of the operation for reflecting the verification based on the analysis result until the model reaches the optimum design idea to the design change idea can be efficiently executed at a high speed. Further, with respect to the final design idea determined at the stage of the first approximate model at the intermediate level, by extracting only the layout information and reflecting it to the 3-dimensional detailed model on the 3-dimensional CAD system side, the design change at the level of the 3-dimensional detailed model becomes unnecessary. Response performance in the designing operation using the 3-dimensional CAD system can be raised.

The above embodiment has been described with respect to the example of the conversion of the simplification at two stages such that after the 3-dimensional detailed model is converted into the layout approximate model (first approximate model) suitable for layout, it is converted into the analysis approximate model (second approximate model) suitable for the analysis program by the combination of the boundary boxes or the like. However, it is sufficient to use a form such that an intermediate approximate model is provided between the 3-dimensional detailed model and the analysis approximate model. The intermediate approximate model is not always limited to the simplification suitable for layout. The present invention incorporates many proper modifications without losing the objects and advantages of the invention. Further, the invention is not limited by the numerical values shown in the above embodiment.

What is claimed is:

1. A 3-dimensional analysis model forming method comprising:
    inputting a 3-dimensional detailed model constructed by a plurality of parts;
    simplifying said 3-dimensional detailed model into a shape suitable for layout and converting it into a first approximate model; and
    further, simplifying said first approximate model into a shape suitable for analysis and converting it into a second approximate model;
    wherein at a point when an optimum design idea of said first approximate model is determined, layout information of the determined first approximate model is extracted and reflected to an original 3-dimensional detailed model.

2. A method according to claim 1, wherein as said second approximate model, said first approximate model is converted into an approximate shape obtained by combining a plurality of boundary boxes corresponding to parts and portions constructing said first approximate model.

3. A method according to claim 2, wherein said boundary box is a rectangular parallelepiped expressing a boundary region of the parts and portions constructing said first approximate model.

4. A method according to claim 1, wherein said second approximate model converted from said first approximate model is registered into a library without being corrected or registered into said library after it is corrected.

5. A method according to claim 4, wherein as said second approximate model, said first approximate model is replaced with the second approximate model registered in said library.

6. A 3-dimensional analysis model forming apparatus comprising:
    an input unit inputting a 3-dimensional detailed model constructed by a plurality of parts;
    a first converting unit simplifying said 3-dimensional detailed model into a shape suitable for layout and converting it into a first approximate model; and
    a second converting unit further simplifying said first approximate model into a shape suitable for analysis and converting it into a second approximate model;
    wherein at a point when an optimum design idea of said first approximate model is determined, said second converting unit extracts layout information of the determined first approximate model and reflects it to an original 3-dimensional detailed model.

7. An apparatus according to claim 6, as said second model, said second converting unit converts said first approximate model into an approximate shape obtained by combining a plurality of boundary boxes corresponding to parts and portions constructing said first approximate model.

8. An apparatus according to claim 7, wherein said boundary box is a rectangular parallelepiped expressing a boundary region of the parts and portions constructing said first approximate model.

9. An apparatus according to claim 6, wherein said second converting unit registers said second approximate model converted from said first approximate model into a library without correcting it or registers said second approximate model into said library after correcting it.

10. An apparatus according to claim 9, wherein as said second approximate model, said second converting unit replaces said first approximate model with the second approximate model registered in said library.

11. A 3-dimensional analysis model forming program controlling a computer to:
    input a 3-dimensional detailed model constructed by a plurality of parts;
    simplify said 3-dimensional detailed model into a shape suitable for layout and convert it into a first approximate model; and
    further, simplify said first approximate model into a shape suitable for analysis and converting it into a second approximate model;
    wherein at a point when an optimum design idea of said first approximate model is determined, layout information of the determined first approximate model is extracted and reflected to an original 3-dimensional detailed model.

12. A computer-readable recording medium 3-dimensional analysis model forming program, wherein said program controls a computer to:
    input a 3-dimensional detailed model constructed by a plurality of parts;
    simplify said 3-dimensional detailed model into a shape suitable for layout and convert it into a first approximate model; and further, simplify said first approximate model into a shape suitable for analysis and convert it into a second approximate model;

wherein at a point when an optimum design idea of said first approximate model is determined, layout information of the determined first approximate model is extracted and reflected to an original 3-dimensional detailed model.

* * * * *

UNITED STATES PATENT AND TRADEMARK OFFICE
CERTIFICATE OF CORRECTION

PATENT NO.    : 6,738,060 B2
DATED         : May 18, 2004
INVENTOR(S)   : Kazuyuki Ujiie et al.

It is certified that error appears in the above-identified patent and that said Letters Patent is hereby corrected as shown below:

Column 10,
Line 26, add -- wherein -- after "," and -- approximate -- after "second".
Line 52, replace "converting" with -- convert --
Line 59, add -- storing a -- after "medium".

Signed and Sealed this

Seventh Day of September, 2004

JON W. DUDAS
*Director of the United States Patent and Trademark Office*